July 22, 1958  E. A. ROBBINS  2,844,164
FLOW LINE POPPET TYPE CHECK VALVE
Filed Sept. 19, 1955  2 Sheets-Sheet 1
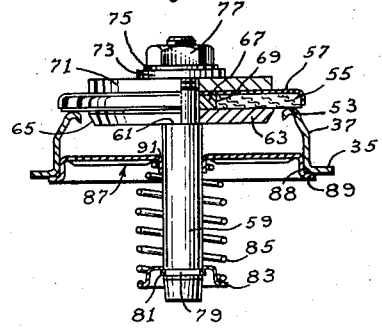
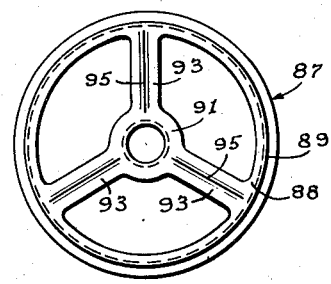
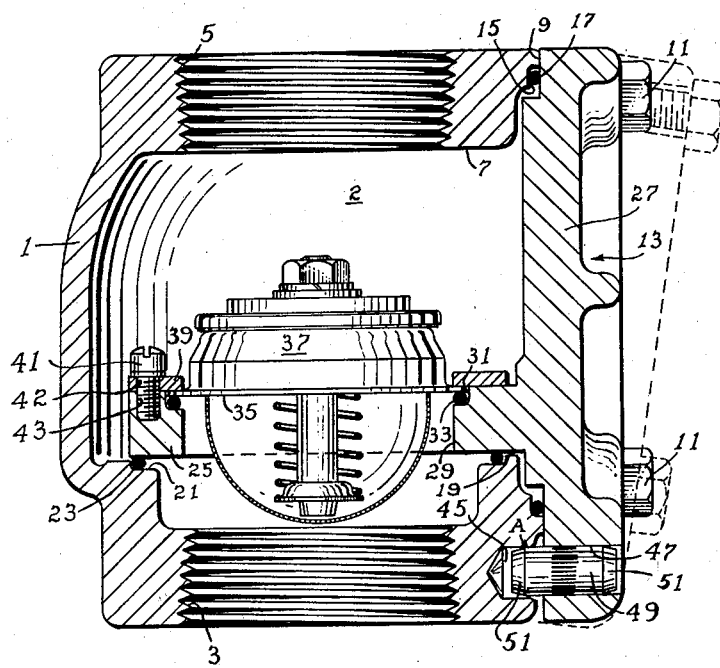
ELMER A. ROBBINS
INVENTOR.
BY Edmund W. E. Kamm
ATTORNEY July 22, 1958      E. A. ROBBINS      2,844,164

FLOW LINE POPPET TYPE CHECK VALVE

Filed Sept. 19, 1955      2 Sheets-Sheet 2

ELMER A. ROBBINS
*INVENTOR.*

BY Edmund W. E. Kamm

ATTORNEY

United States Patent Office 2,844,164
Patented July 22, 1958

2,844,164

FLOW LINE POPPET TYPE CHECK VALVE

Elmer A. Robbins, Fort Wayne, Ind., assignor to Tokheim Corporation, Fort Wayne, Ind., a corporation of Indiana Application September 19, 1955, Serial No. 535,105

14 Claims. (Cl. 137—454.6)

This invention relates to a flow line, poppet type check valve from which the valve mechanism may be removed bodily from the valve body without breaking pipe connections or otherwise disturbing the flow line.

It is an object of the invention to provide a check valve of the kind described which is provided with a strainer which is also removable with the valve.

A further object of the invention is to provide a valve body having an opening disposed to open laterally from the openings which receive the inlet and outlet pipes and through which the valve, valve seat, strainer and other parts may be removed.

Another object of the invention is to provide a combined cover for the opening mentioned above and a holder which also supports the valve seat, valve, strainer etc.

It is another object of the invention to provide means for sealingly mounting the valve holder on the body.

Yet another object of the invention is to provide means for guiding and supporting the valve assembly in its movement to and from its position in the valve body to facilitate removal and insertion.

Still another object of the invention is to provide a poppet guide and strainer which are so formed that the strainer may be removably suspended from the guide.

Another important object of the invention is to provide means for simultaneously compressing two gaskets wihch are disposed in different, angularly spaced planes with a single set of screw fasteners.

These and other objects will become apparent from a study of the specification and the drawings which are appended thereto, form a part thereof and in which:

Figure 1 is a vertical sectional view showing the various parts in assembled relation.

Figure 3 is a view, partly in section showing the poppet structure.

Figure 7 is a plan view of the poppet guide showing the arms which carry the strainer.

Figure 2:
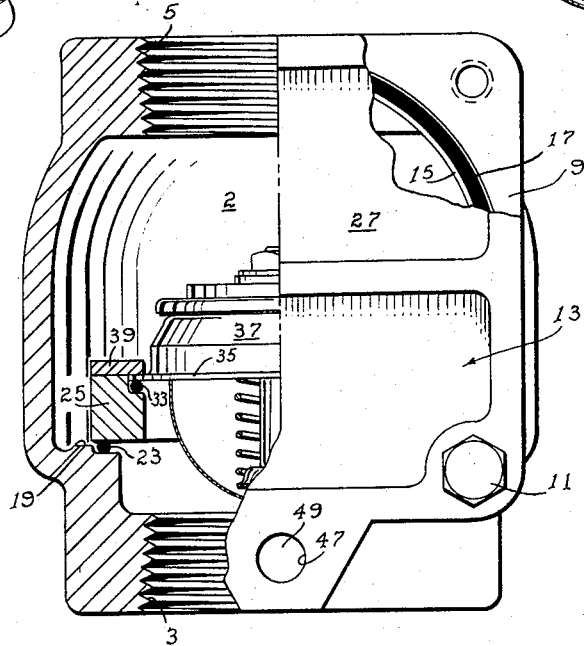
Figure 2 is an elevation, with parts shown in section, viewed from the right of Figure 1.

Referring now to Figures 1 and 2, the numeral 1 represents the valve body which defines a central valve chamber 2 and which is provided with coaxial, tapped openings 3 and 5 to receive the inlet and discharge pipes respectively. The body is also provided with a lateral opening 7 which is roughly rectangular and through which the valve and strainer assembly is inserted and removed.

A substantially square flange 9 surrounds the opening 7 and is drilled and tapped adjacent the corners to receive screws 11 which enter oversize holes in the cap portion of the holder 13 to mount the poppet valve holder on the body. The flange is provided with an internal rabbet forming a seat 15 which receives an O-ring 17 which is compressed between the body and holder to seal the opening 7.

A cylindrical boss 19 is disposed inside the body and substantially coaxially of the openings 3 and 5. This boss is also provided with a rabbet forming a seat 21 which receives an O-ring 23 which is compressed between the boss and the ring or poppet supporting portion 25 of the poppet holder. The manner of securing compression will be explained below.

Figure 6:
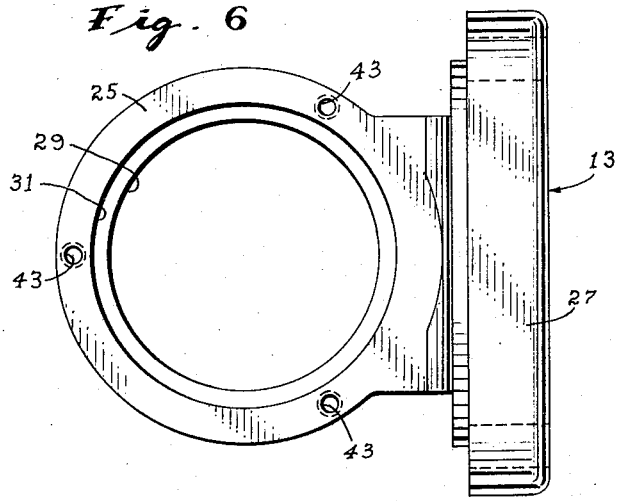
Figure 6 is a plan view of the poppet holder.

Referring now to Figures 1, 2 and 6, the ring portion of the holder extends substantially at right angles to the cap portion 27 of the holder. The ring is provided with a circular opening 29 which is rabbeted to form a seat 31 to receive an O-ring 33 which is compressed thereon by the flange 35 of the valve seat 37. The flange 35 is held in sealing contact with the O-ring 33 by means of the circular retainer 39 and screws 41 which pass through holes 42 in the retainer and enter tapped holes 43 in the ring 25.

The body 1 is provided with a laterally extending, cylindrical blind hole or socket 45 which extends in the same direction at the opening 7 but is disposed adjacent the inlet 3 and below the level of seat 21. The cap portion of the holder is provided with an opening 47 which has its longitudinal axis parallel to that of hole 45. Hole 45 is preferably somewhat larger in diameter than opening 47. For example, if 47 is .376″ in diameter, 45 may be .406″. These dimensions are merely representative and not critical.

Further, the distance from the top level of hole 45 to the surface 21 is less than the distance from the top level of hole 47 to the lower surface of ring 25 by an amount which is less than the thickness of the gasket 23 in its free state, so that the gasket will be compressed upon assembly of the holder and body to form an effective seal between the body 1 and ring 25. A knurled pin 49 having tapered ends 51 and of about .375″ diameter (on the smooth surface) is pressed into the hole 47 so that one end extends from the cap portion 27 in the same direction as the ring portion 27 so that the pin may enter the hole 45. It should be noted that the point of contact "A" between the pin and the upper portion of the socket will serve as a fulcrum as the screws 11 are drawn up.

It will thus be seen that to assemble the valve mechanism in the body 1, the mechanism will be tilted to the position in dashed lines in Figure 1, the valve assembly with its support 25 will be placed in the chamber 2, the pin 49 will be entered as far as possible into hole 45 and the valve mechanism and cap will then be rotated toward the full line position. The screws 11 when inserted and drawn up will not only compress the ring 17 but also the ring 23, to establish the required seals. The pin 49 acts as a lever which rides on the upper surface of the hole 45 as a fulcrum and thus enables the screws 11 to move ring 25 in a gasket compressing direction.

Obviously, the exact dimensions disclosed are cited to explain the principles employed and other dimensions may be used if desired, in the practice of the invention.

As shown particularly in Figure 3, the valve seat 37 has its upper edge turned inwardly and downwardly to form an annular surface 53 which is adapted to be engaged by the poppet disc 55 which may be of synthetic rubber or other suitable material which is vulcanized within the upper poppet retainer 57.

The valve stem 59 is provided with a shoulder 61 on which rests the poppet support disc 63 which is preferably chamfered at 65 to tend to center the poppet in the seat. Next a spacer 67 is mounted on the stem so as to be received in the central opening 69 of the poppet disc 55 which is larger than the opening in the retainer 57 so that the spacer will engage the parts 63 and 57 to limit the amount of compression which can be placed upon the disc 55. The space between the spacer and disc 55 is preferably filled with a suitable cement.

An additional supporting disc 71, a plain washer 73, a lock washer 75 and a nut 77 are all mounted on the valve stem and serve to support and hold in place the valve parts previously recited.

A circumferential groove 79 is formed adjacent the lower end of the stem to receive a snap ring 81 which in turn supports on the stem a spring seating washer 83, a compression spring 85 and a poppet guide 87 which has a rim portion 88 adapted to enter into the lower end of the valve body 37. The rim 88 has a radially extending flange 89 which abuts a portion of flange 35 on the valve body to limit the entry of the guide into the seat.

The guide has a central hub 91 (see also Fig. 7) which both guides the stem and serves as a seat for the spring. The hub is connected to the rim 88 by means of three arms 93 which are preferably slightly indented as at 95, longitudinally, to provide additional stiffness.

It will thus be seen that the poppet is held on its seat by the spring 85 and is guided in its movement to and from the seat.

Figure 4:
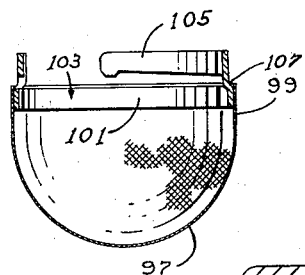
Figure 4 is a sectional view of the strainer showing the supporting arms.
Figure 5:
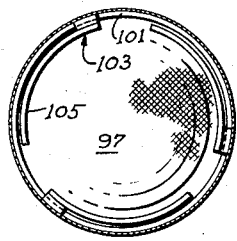
Figure 5 is a plan view of the strainer.

Referring to Figures 4 and 5 it will be seen that a screen basket 97 of substantially hemispherical shape is provided with a cylindrical rim 99 which is fastened to the cylindrical portion 101 of a holder 103. Formed integrally with the holder 103 are three, curved horizontally extending arms 105. The connecting member 107 is offset inwardly so that the arms will enter inside the rim portion of the poppet guide. The arms are spaced endwise from the rim 99 a sufficient distance to pass the spokes 93 of the guide so that the basket may be raised to the guide with the gaps between the arms aligned with the spokes and turned counter-clockwise (Figs. 5) to attach the screen to the valve assembly. The cylindrical rim portion of the screen fits within the rim portion of the guide so that there is substantially a metal to metal seal established.

It will be seen therefore that the valve and strainer forms a unitary assembly which may be inserted in or removed from the ring portion 25 of the holder by applying or removing the clamping ring 39 which is held by the three screws 41. Similarly, the holder with the valve and strainer in place may be installed or removed by inserting or removing the four screws 11 and without disturbing any pipe lines or connections to the lines. The removal, cleaning, repair and reinsertion or the removal and substitution of the valve-strainer assembly is thus greatly expedited resulting in saving of maintenance time and down time of the systems in which such valves are used.

O-ring seals are used throughout to insure proper sealing of the joints and the valve and its associated parts are mostly stampings and screw machine products so the valve mechanism is inexpensive and can be discarded when it fails and a new valve can be readily substituted therefor.

While I have herein set forth a specific embodiment of my invention for purposes of illustration, it is obvious that various changes, alterations, and substitutions can be made in the form and arrangement of the parts of the device without departing from the spirit of the invention. I do not, therefore, desire to be limited to the embodiment disclosed but desire protection falling fairly within the scope of the appended claims.

What I consider to be new and desire to protect by Letters Patent of the United States of America is:

1. In a check valve, the combination of a valve body defining a central chamber with substantially oppositely disposed first and second liquid openings and a lateral opening disposed at one side of and between said first mentioned openings, said body defining substantially planar seats disposed around and substantially normal to the axes of said first and lateral openings respectively, a valve holder removably mounted on said body, having a valve supporting portion, with a valve assembly mounted thereon, adapted to close said first opening and a cap portion adapted to close said lateral opening, yieldable sealing means disposed on said seats, around said first and lateral openings, between the body and the supporting and cap portions respectively, said valve supporting portion and said valve assembly being insertable as a unit through said lateral opening.

2. In a check valve, the combination of a valve body defining a central chamber with substantially oppositely disposed first and second liquid openings and a lateral opening disposed at one side of and between said first mentioned openings, said body defining substantially planar seats disposed around and substantially normal to the axes of said first and lateral openings respectively, a valve holder removably mounted on said body, having a valve supporting portion, with a valve assembly mounted thereon, adapted to close said first opening and a cap portion disposed in rigid, fixed relation with the valve supporting portion and adapted to close said lateral opening, yieldable sealing means disposed on said seats, around the first and the lateral openings between the body and the supporting and cap portions respectively, and means for clamping the cap portion on the body, said clamping means and holder being tiltable toward said sealing means for simultaneously compressing said sealing means, said valve supporting portion and said valve assembly being insertable as a unit through said lateral opening.

3. In a check valve, the combination of a valve body defining a central chamber with substantially oppositely disposed first and second liquid openings and a lateral opening disposed at one side of and between said first mentioned openings, said first and said lateral openings each being substantially perpendicular to each other, said body defining substantially plannar seats disposed around and substantially normal to the axes of said first and lateral openings respectively, a valve holder removably mounted on said body, having a valve supporting portion, with a valve assembly mounted thereon, adapted to close said first opening and a cap portion disposed in rigid, fixed relation with the valve supporting portion and adapted to close said lateral opening, yieldable sealing means disposed on said seats between the body and the supporting and cap portions respectively, and means acting on said cap to tilt the holder for simultaneously compressing said sealing means, said valve supporting portion and said valve assembly being insertable as a unit through said lateral opening.

4. In a check valve, the combination of a valve body defining a central chamber with substantially oppositely disposed first and second openings and a lateral opening disposed at one side of and between the first and second openings, said body defining substantially planar seats disposed around and substantially normal to the axes of said first and lateral openings respectively, a valve holder, having a valve supporting portion and a valve, disposed in closing relation with the first opening and a cap portion disposed in rigid, fixed relation with the valve supporting portion and disposed in closing relation with the lateral opening, said valve and valve supporting portion being insertable as a unit in said body through said lateral opening, first compressible gasket means disposed on said seat, around said first opening, between body and said valve supporting portion, second compressible gasket means disposed on said seat, around the lateral opening, between the body and the cap portion, adjustable fastening means for compressing said second gasket means, and means on said body and holder for tilting said supporting portion in a path to compress said first gasket when said fastening means are adjusted to fasten the cap to the body.

5. In a check valve, the combination of a valve body defining a central chamber with substantially oppositely disposed first and second openings and a lateral opening disposed at one side of and between the first and second openings, a valve holder, having a valve supporting portion and a valve, disposed in closing relation with the first opening and a cap portion disposed in closing relation with the lateral opening, said valve and valve supporting portion being insertable as a unit in said body through said lateral opening, first compressible gasket means disposed between said body and said valve supporting portion, second compressible gasket means disposed between the body and the cap portion, adjustable fastening means for compressing said second gasket means, and pin and socket means on said body and holder for directing said supporting portion in a path to compress said first gasket when said fastening means are adjusted to fasten the cap to the body.

6. In a check valve, the combination of a valve body defining a central chamber with substantially oppositely disposed first and second openings and a lateral opening disposed at one side of and between the first and second openings, a valve holder, having a valve supporting portion and a valve, disposed in closing relation with the first opening and a cap portion disposed in rigid, fixed relation with the valve supporting portion disposed in closing relation with the lateral opening, said valve and valve supporting portion being insertable as a unit in said body through said lateral opening, first compressible gasket means disposed around said first opening, between said body and said valve supporting portion, second compressible gasket means disposed around said lateral opening, between the body and the cap portion, adjustable fastening means for compressing said second gasket means, and fulcrum means on said body and holder for directing said supporting portion in a path to compress said first gasket when said fastening means are adjusted to fasten the cap to the body.

7. In a check valve, the combination of a valve body defining a central chamber with substantially oppositely disposed first and second openings and a lateral opening disposed at one side of and between the first and second openings, a valve holder, having a valve supporting portion and a valve, disposed in closing relation with the first opening and a cap portion disposed in closing relation with the lateral opening, said valve and valve supporting portion being insertable as a unit in said body through said lateral opening, first compressible gasket means disposed between said body and said valve supporting portion, second compressible gasket means disposed between the body and the cap portion, adjustable fastening means for compressing said second gasket means, and cylindrical pin and socket means on said body and holder for directing said supporting portion in a path to compress said first gasket when said fastening means are adjusted to fasten the cap to the body and said socket being of greater diameter than said pin.

8. The structure defined in claim 4 wherein the longitudinal axis of the first and the lateral openings are substantially perpendicular to each other and the cap and valve supporting portions of the holder are likewise substantially perpendicular.

9. In a check valve, the combination of a body defining a chamber having substantially axially aligned first and second liquid openings, a lateral opening disposed at one side of and between said first and second openings and having its axis disposed at an angle to the axis of the first opening, a gasket seat formed around each said first and said lateral openings, a resilient gasket on each seat, a valve holder comprising a cap portion and a valve supporting portion, a seat formed on said supporting portion adapted to coact with the gasket around said first opening, a seat formed on said cap portion adapted to coact with the gasket surrounding the lateral opening, a socket formed in the body adjacent the first opening and having its axis extending substantially parallel with the axis of the lateral opening, a pin mounted in the cap so as to enter the socket, said socket being slightly larger than the pin so that the pin may rock therein, the distance between the point of contact between the pin and socket and the seat surrounding the first opening being less than the distance between said point and the seat on said supporting portion by an amount which is less than the free thickness of the corresponding gasket and screw fasteners passing through the cap portion and entering the body, said fasteners being disposed so as to pivot the holder about the point of contact between the pin and socket to compress both gaskets between their respective seats as the fasteners are drawn tight.

10. The structure defined in claim 9 wherein the socket is a cylindrical bore in the body and the pin is a cylindrical pin.

11. The structure as defined in claim 9 wherein the seats on the body are disposed at right angles to each other.

12. The structure defined in claim 9 wherein the seat surrounding the first opening and the screw fasteners are all disposed on one side of the pin and socket.

13. The structure defined in claim 9 wherein the cap portion has openings for the passage of the screw fasteners which are slightly larger in diameter than the fasteners.

14. In a check valve, the combination of a valve body defining a central chamber with substantially oppositely disposed first and second liquid openings and a lateral opening disposed at one side of and between said first mentioned openings, a valve holder removably mounted on said body, having a valve supporting portion, with a valve assembly mounted thereon, adapted to close said first opening and a cap portion disposed in rigid fixed relation with the valve supporting portion and adapted to close said lateral opening, said valve supporting portion and said valve assembly being insertable as a unit through said lateral opening, said valve assembly comprising a valve seat, a poppet valve mounted for movement toward and away from the seat, yieldable means for urging the valve toward the seat, a combined valve guide and spring seat disposed between the spring and the valve seat to render the structure a unitary assembly, said combined guide and seat comprising radially extending arms, a strainer having axially extending hooks adapted to engage said arms to suspend the strainer therefrom, said assembly including means for supporting the assembly on the supporting portion of the holder.

References Cited in the file of this patent

UNITED STATES PATENTS

| | | |
|---|---|---|
| 40,723 | Gilson | Nov. 24, 1863 |
| 196,368 | Lowell | Oct. 23, 1877 |
| 1,782,238 | Kirchhan | Nov. 18, 1930 |
| 1,901,982 | Pardue | Mar. 21, 1933 |
| 2,431,437 | Van Der Werff | Nov. 25, 1947 |
| 2,505,992 | Rike | May 2, 1950 |
| 2,524,951 | Ashton | Oct. 10, 1950 |